Feb. 6, 1968 W. B. HALL 3,368,084
CASCADED THERMIONIC ENERGY CONVERTER TUBE
Filed July 31, 1964
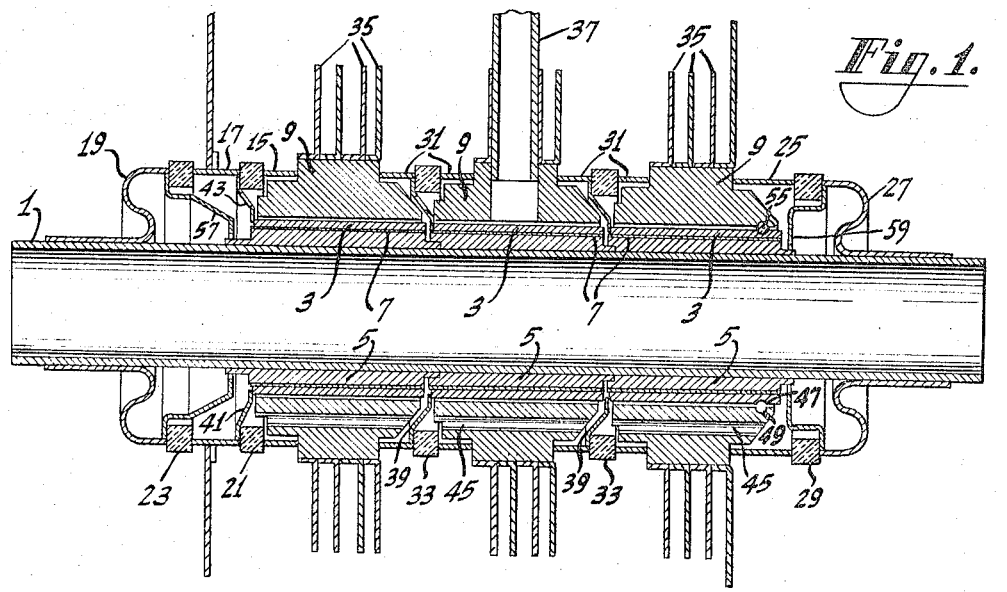
Fig. 1.
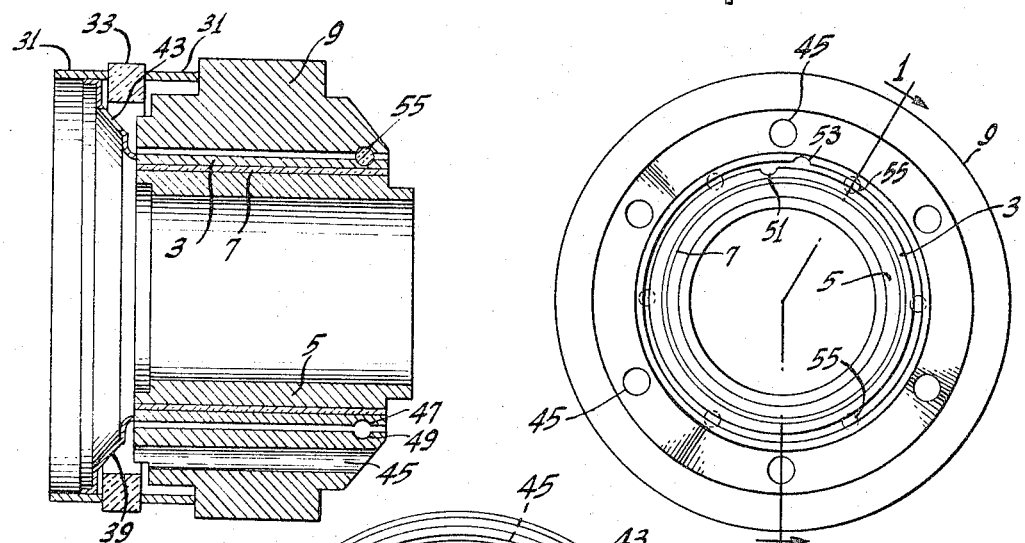
Fig. 2.
Fig. 3.
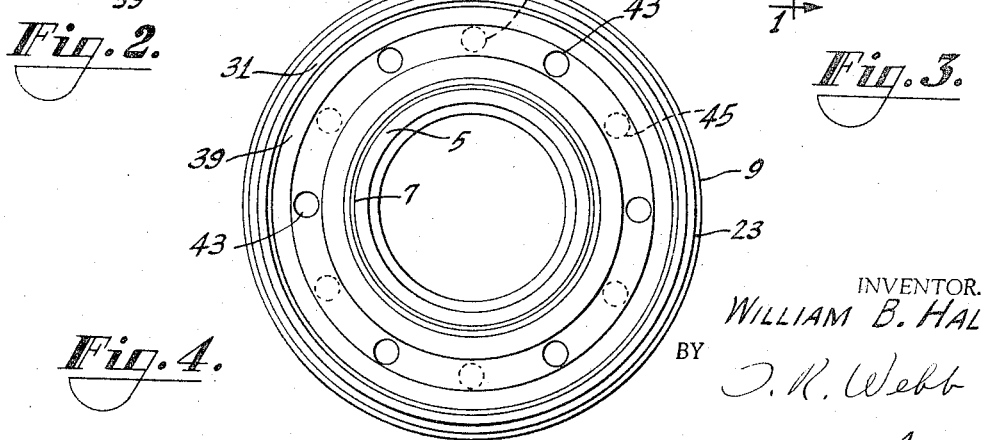
Fig. 4.
INVENTOR.
WILLIAM B. HALL
BY 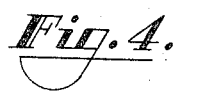
Agent United States Patent Office 3,368,084
Patented Feb. 6, 1968

3,368,084
CASCADED THERMIONIC ENERGY
CONVERTER TUBE
William B. Hall, Landisville, Pa., assignor to Radio
Corporation of America, a corporation of Delaware
Filed July 31, 1964, Ser. No. 386,726
2 Claims. (Cl. 310—4)

The present invention relates to thermionic energy converter tubes, and particularly to a converter tube having a plurality of converter diode units incorporated in series in a common envelope.

A thermionic energy converter tube is an electron tube having a thermionic election emitter or cathode and a collector designed to convert heat energy applied to the emitter into electrical power available at the external terminals of the electrodes. In a practical converter tube the emitter and collector may be made part of the tube envelope, or thermally coupled thereto, to permit heating the emitter from an external source and cooling the collector by external means. While the current output of such a tube can be made relatively high, of the order of hundreds of amperes, by using an alkali metal atmosphere such as cesium in the tube to neutralize the electron space charge, the voltage output is very low, of the order of a volt or less. Therefore, in order to produce a higher voltage, tubes are cascaded in series, like batteries. It has been proposed that the emitters of such a series of converter tubes be heated from a common heat source by mounting the tubes on a heat duct or pipe adapted to conduct a hot medium, such as liquid lithium, therethrough. This heat pipe, if made of metal, must be electrically insulated from the emitters of the converter tubes, in order to avoid short circuiting the series of tubes. In this case, the insulation between the heat pipe and each emitter should also provide a good mechanical and thermal bond or connection therebetween. If the heat pipe is nonconductive, the emitters may be mounted directly on the pipe and need only be insulated from each other. Arrangements have been built wherein separate converter tubes have been mounted in spaced relation along a common metal heat pipe, with each emitter thermally connected to but electrically insulated from the pipe by means of a thin layer of ceramic insulation cast in the annular space therebetween.

An object of the present invention is to provide a new and improved thermionic energy converter tube.

A more specific object of the invention is to provide an improved thermionic energy converter tube incorporating a plurality of series-connected converter diode units within a common sealed envelope.

In accordance with the invention, a plurality of emitters are mounted in a sealed envelope, in insulated relation to each other, with each emitter having one major surface thermally coupled to a large area heat transfer member forming part of the envelope and the other major surface adjacent to a similar surface of one of a plurality of collectors which also form part of the envelope, to form a plurality of thermionic converter diode units within a common envelope. Preferably, the heat transfer member, emitters and collectors are concentric hollow metal cylinders, with the emitters insulated from the metal heat transfer member. Each collector, except the last one, is connected within the envelope to the cathode of the next diode unit. Preferably, the envelope contains a quantity of ionizable metal, such as cesium, to supply positive ions for neutralizing the electron space charge, and the electrodes of adjacent diode units are connected by a low-resistance flexible metal diaphragm, which serves also as a shield between the diodes for suppressing low voltage arcs. One or more small holes are provided in each diaphragm to equalize the vapor pressure in all the diode units. Holes may also be provided in the collectors to facilitate vapor circulation. Further low voltage arc suppression may be obtained by coating the adjacent emitter and diaphragm surfaces with aluminum oxide, for example. Arc suppression shields may be interposed between the end emitters and the common heat transfer member. In at least one diode unit, the emitter and collector may be precisely spaced and insulated from each other by a plurality of refractory insulating balls snugly fitting in a pair of complemental substantially semi-circular circumferential grooves in the two electrodes, with a pair of similar longitudinal grooves to permit assembly of the balls.

In the drawing:
FIGURE 1 is an axial sectional view, taken along the line 1—1 of FIGURE 3, of a plural-diode thermionic energy converter tube embodying the present invention;
FIGURE 2 is a similar enlarged view of one of the diodes of FIGURE 1;
FIGURE 3 is a right end view of FIGURE 2; and
FIGURE 4 is a left end view of FIGURE 2.

The thermionic energy converter tube shown, for example, in FIGURES 1–4 comprises an elongated hollow cylindrical refractory heat tube 1 adapted to transfer heat from a medium, such as liquid lithium heated by a nuclear reactor or other heat source, to the emitters of the tube. The emitters 3 are made of a refractory metal, such as molybdenum. Three axially spaced hollow cylindrical metal emitters 3 are mounted on the heat tube 1 in electrically insulated and thermally coupled relation thereto. The emitters 3 may be mounted in the following manner. First, each emitter 3 is assembled concentrically with a hollow cylindrical metal mounting member 5 having a length slightly greater than the emitter 3, an inner diameter equal to the outer diameter of the heat tube 1 and an outer diameter a few mils less than the inner diameter of the emitter 1. Then a mass 7 of refractory insulating material, such as sapphire, is melted and cast in the space between the emitter 3 and member 5. This produces a good mechanical and thermal bond or connection between the two members while maintaining electrical insulation therebetween. Then, the bonded assemblies of the emitters 3 and members 5 are assembled on the heat tube 1, as shown in FIGURE 1, and the member 5 are attached to the heat tube 1, as by a high temperature braze. The mounting members 5 are made of a refractory heat conductive metal, such as molybdenum. The adjacent ends of the members 5 may overlap, as shown, and be coated with insulating material, such as aluminum oxide, to suppress low voltage arcs between the emitters 3 and the heat tube 1. The adjacent ends of the emitters 3 may be similarly coated with insulating material.

Each of the cylindrical emitters 3 individually is closely surrounded by a different hollow cylindrical collector 9, of molybdenum, for example, to form a converter diode unit. The three collectors 9 may be supported as follows. The first collector 9, on the left in FIGURE 1, is mechanically connected to the left end of the heat tube 1 by a series of metal rings 15, 17 and 19 alternating with two ceramic rings 21 and 23 which are brazed or otherwise sealed together and to the collector 9 and heat tube 1. The third collector 9 is similarly connected to the right end of heat tube 1 by metal rings 25 and 27 and a ceramic ring 29. The second or middle collector 9 is similarly connected to the first and third collectors 9 by metal rings 31 and ceramic rings 33. Thus, the heat tube 1, collectors 9 and rings 15 through 33 make up an annular or toroidal sealed envelope containing the emitters 3. The collectors may be provided with radial metal fins 35 for cooling the collectors by heat radiation. The envelope may be evacuated during processing through an exhaust tube 37 connected to one of the collectors 9.

Preferably, a quantity of an ionizable metal, such as cesium, is introduced into the envelope, during manufacture or processing of the converter tube to provide a low pressure vapor atmosphere therein during operation. The vapor not only provides a source of positive ions in the emitter-collector space for neutralizing the negative space charge of the electrons and thereby producing the maximum current output, but also provides a vapor coating on the cooled collector surfaces which lowers the effective work function thereof to produce the maximum voltage output.

Each collector 9, except the last one, is electrically connected within the envelope to the emitter 3 of the next diode unit by a low-resistance lead in the form of a flexible metal diaphragm 39, as shown in FIGURES 1 and 2. A similar diaphragm 41 is connected between the emitter 3 of the first diode and the metal ring 17, which serves the positive terminal of the converter. The collector of the last diode, or one of the fins 35 connected thereto, serves as the negative terminal of the converter. Each of the two connecting diaphragms 39 also serves as an arc-suppression shield between adjacent diode units. Each of diaphragms 39 and 41 is provided with a series of small holes 43 (FIGURE 4) for the passage of vapor therethrough. The collectors 9 may also be provided with a series of vapor circulation holes or passages 45, offset from the holes 43 to minimize arcs therethrough. The portion of each diaphragm 39 close to the emitter 3 of the adjacent diode unit may be coated with aluminum oxide to prevent arcs therebetween. The diaphragms 39 and 41 are flexible to accommodate differential expansion of the emitters and collectors.

The distance between each emitter 3 and the associated collector 9, which is exaggerated in the drawing, is preferably in the range from 5 to 30 mils, for a tube with a cesium atmosphere. In order to provide additional support for the collectors 9 and maintain a desired uniform spacing between the emitters and collectors, the electrodes of one or more of the diode units may be keyed together as shown in the drawing. A pair of complemental, substantially semi-circular, circumferential grooves 47 and 49 are formed in the adjacent surfaces of the emitter 3 and collector 9, respectively, near one end thereof, to form a circumferential ball race of circular cross section. A pair of substantially semi-circular longitudinal grooves 51 and 53 extend from the mating grooves 47 and 49 to the ends of the electrodes. A series of insulating balls 55, of sapphire for example, having a diameter equal to that of the ball race 47–49, are positioned uniformly along the race to lock the electrodes together axially and precisely space them radially. The balls 55 are inserted into the ball race through the grooves 51 and 53 with the latter grooves in mating relation, and then the electrodes are rotated to non-mating relation of these grooves before being fixed to the envelope parts. The balls 55 can be moved to the desired positions by means of a thin tool inserted between the emitter 3 and the collector 9. The ball race may be completely filled with the balls 55.

The converter tube may also include arc suppression shields 57 and 59 for blocking the line of sight between the end emitters 3 and the heat tube 1. These shields may be coated with aluminum oxide to minimize arcing.

It will be seen that the invention provides a building-block design wherein any number of converter diodes can be incorporated in a common envelope by including additional emitter-collector sub-assemblies in the series of diodes. The converter tube is very efficient because of the close thermal coupling between the heat tube and the emitters, the low resistance connections between adjacent diodes, the means for heating the emitters and for cooling the collectors, the precise spacing of the electrodes, and the various arc-suppressing features described.

In a test of a three-unit thermionic tube or module constructed as disclosed herein, a stable power output of more than 1 watt/cm.² of emitter area was obtained at an emitter temperature of 1500° K. The power output in this test was 60 watts at 0.84 volt. This represents a 12% improvement over the combination of three separate single-unit converters of similar structure, each of which produces power at only ¼ volt at the same emitter temperature.

What is claimed is:
1. A thermionic energy converter tube comprising:
 (a) a hollow cylindrical heat tube forming the inner wall of an annular envelope;
 (b) at least two axially-spaced hollow cylindrical thermionic emitters surrounding said heat tube;
 (c) means mounting said emitters on said heat tube in heat conducting relation therewith and in electrical insulating relation with each other;
 (d) at least two axially-spaced hollow cyindrical collectors each surrounding one of said emitters in spaced relation therewith to form a diode unit;
 (e) envelope means surrounding said emitters and at least the inner surfaces of said collectors and sealed to the ends of said heat tube to complete said annular envelope;
 (f) means within said envelope electrically connecting each collector except the last one to the emitter of the next diode unit; and
 (g) means for precisely spacing and insulating one of said emitters from the surrounding collector, comprising:
  (1) a pair of complemental circumferential grooves of substantially semicircular cross-section formed in the adjacent surfaces of said emitter and collector;
  (2) a pair of longitudinal grooves of the same cross-section and depth as said circumferential grooves formed in the adjacent surfaces of said emitter and collector, extending from said circumferential grooves to one end of said electrodes; and
  (3) a plurality of spherical balls of refractory insulating material distributed around and snugly fitting in said circumferential grooves.

2. A thermionic energy converter tube comprising:
 (a) a cylindrical emitter;
 (b) a hollow cylindrical collector coaxially surrounding said emitter; and
 (c) means for precisely spacing and insulating said emitter from said collector, comprising:
  (1) a pair of complemental circumferential grooves of substantially semicircular cross-section formed in the adjacent surfaces of said emitter and collector;
  (2) a pair of longitudinal grooves of the same cross-section and of the same depth as said circumferential grooves formed in the adjacent surfaces of said emitter and collector, extending from said circumferential grooves to one end of said electrodes; and
  (3) a plurality of spherical balls of refractory insulating material distributed around and snugly fitting in said circumferential grooves.

References Cited

UNITED STATES PATENTS

| | | | |
|---|---|---|---|
| 3,248,557 | 4/1966 | Hoh | 310—4 |
| 2,916,649 | 12/1959 | Levin. | |
| 3,054,914 | 9/1962 | Hatsopoulos | 310—4 |
| 3,113,091 | 12/1963 | Rasor | 310—4 |
| 3,129,345 | 4/1964 | Hatsopoulos | 310—4 |
| 3,176,164 | 3/1965 | Beggs | 310—4 |
| 3,176,165 | 3/1965 | Lawrence | 310—4 |
| 3,211,930 | 10/1965 | Clement | 310—4 |

FOREIGN PATENTS 1,130,873   6/1962   Germany.

MILTON O. HIRSHFIELD, *Primary Examiner.*

D. F. DUGGAN, *Assistant Examiner.*

UNITED STATES PATENT OFFICE
CERTIFICATE OF CORRECTION

Patent No. 3,368,084                  February 6, 1968

William B. Hall

It is hereby certified that error appears in the above numbered patent requiring correction and that the said Letters Patent should read as corrected below.

Column 2, line 42, for "member" read -- members --; column 3, line 71, after "thermionic" insert -- converter --; column 4, line 62, for "3,248,557" read -- 3,248,577 --.

Signed and sealed this 8th day of April 1969.

(SEAL)
Attest:

Edward M. Fletcher, Jr.                  EDWARD J. BRENNER

Attesting Officer                  Commissioner of Patents